(12) United States Patent
Bao et al.

(10) Patent No.: US 11,410,351 B2
(45) Date of Patent: Aug. 9, 2022

(54) METHOD AND SYSTEM FOR IMPROVING CT IMAGE QUALITY

(71) Applicant: SHANGHAI UNITED IMAGING HEALTHCARE CO., LTD., Shanghai (CN)

(72) Inventors: Yuan Bao, Shanghai (CN); Guotao Quan, Shanghai (CN); Rengcai Yang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

(21) Appl. No.: 16/891,084

(22) Filed: Jun. 3, 2020

(65) Prior Publication Data

US 2020/0380737 A1    Dec. 3, 2020

(30) Foreign Application Priority Data

Jun. 3, 2019    (CN) .......................... 201910476005.4

(51) Int. Cl.
    *G06T 11/00*      (2006.01)
    *G06T 5/50*      (2006.01)

(52) U.S. Cl.
CPC .............. *G06T 11/005* (2013.01); *G06T 5/50* (2013.01); *G06T 2207/10081* (2013.01); *G06T 2207/20081* (2013.01); *G06T 2207/20084* (2013.01); *G06T 2207/20221* (2013.01); *G06T 2210/41* (2013.01)

(58) Field of Classification Search
None
See application file for complete search history.

(56) References Cited

U.S. PATENT DOCUMENTS

| | | | | |
|---|---|---|---|---|
| 2006/0217782 A1* | 9/2006 | Boveja | ............... | A61N 1/37235 607/45 |
| 2008/0247504 A1* | 10/2008 | Edic | ........................ | G01T 1/295 378/9 |
| 2011/0243298 A1* | 10/2011 | Miyazaki | ............. | A61B 6/4021 378/15 |
| 2014/0348301 A1* | 11/2014 | Lee | ....................... | A61B 6/4021 378/125 |
| 2015/0363904 A1* | 12/2015 | Arai | ...................... | G06T 7/0012 382/131 |
| 2016/0364856 A1* | 12/2016 | Zheng | ................... | G06K 9/4604 |
| 2018/0325471 A1* | 11/2018 | Ji | .......................... | A61B 6/4435 |
| 2019/0328348 A1* | 10/2019 | De Man | ............... | A61B 6/5205 |
| 2019/0350539 A1* | 11/2019 | Guo | ........................ | H01J 35/14 |

* cited by examiner

*Primary Examiner* — Jiangeng Sun
(74) *Attorney, Agent, or Firm* — Metis IP LLC

(57) ABSTRACT

Embodiments of the present disclosure may disclose a method for improving CT image quality. The method for improving the CT image quality may include obtaining SFS data. The SFS data may include SFS scan data or an SFS image. The SFS scan data may be acquired by a CT device in an SFS state. The SFS image may be generated by reconstructing scan data acquired by the CT device via scanning in the SFS state. The method may include generating a corresponding optimized image by processing the SFS data based on an image quality optimization model. The image quality optimization model may be a machine learning model. The present disclosure may simulate the SFS image as an FFS image using a deep neural network model, thereby improving a resolution of the SFS image and reduce artifacts in the SFS image.

20 Claims, 8 Drawing Sheets

METHOD AND SYSTEM FOR IMPROVING CT IMAGE QUALITY

CROSS-REFERENCE TO RELATED APPLICATIONS

This application claims priority of Chinese Patent Application No. 201910476005.4 filed on Jun. 3, 2019, the contents of which are hereby incorporated by reference.

TECHNICAL FIELD

The present disclosure relates to image processing, and more specifically relates to a method and system for improving CT image quality.

BACKGROUND

The X-ray tube is a source of radiation for an electronic computed tomography (CT) device. X-ray tubes can be categorized as single focal spot (SFS) X-ray tubes or flying focal spot (FFS) X-ray tubes. By using the FFS X-ray tube, the amount of data acquired by a CT detector can be improved, and the imaging quality at a focusing region is usually better than the imaging quality at a non-focusing region. Thus, the FFS X-ray tube may improve the imaging quality of a CT image. However, the cost of the FFS X-ray tube is high. Meanwhile, using the FFS X-ray tube increases the amount of data for transmission and causes instability of the CT device. Moreover, there are still many CT devices utilizing the SFS X-ray tube. Therefore, if the imaging quality of the SFS X-ray tube is improved such that it can match the imaging quality of a flying focal spot (FFS) image, the quality of a single focal spot (SFS) image may be greatly improved while the cost of the CT device can be reduced.

SUMMARY

According to one embodiment of the present disclosure, a method for improving CT image quality may be provided. The method for improving the CT image quality may include obtaining single focal spot (SFS) data. The SFS data may include single focal spot (SFS) scan data or a single focal spot (SFS)SFS image. The SFS scan data may be acquired by a CT device in a single focal spot (SFS) state. The SFS image may be generated by reconstructing scan data obtained by the CT device via scanning in the SFS state. The method may further include generating a corresponding optimized image by processing the SFS data based on an image quality optimization model. The image quality optimization model may be a machine learning model.

In some embodiments, the image quality optimization model may be generated through sample data training. The sample data may include flying focal spot (FFS) scan data or a flying focal spot (FFS) image. The FFS scan data may be acquired by a CT device in a flying focal spot (FFS) state. The FFS image may be reconstructed based on scan data acquired by the CT device via scanning in the FFS state.

In some embodiments, the image quality optimization model may be a residual neural network model.

In some embodiments, the generating the corresponding optimized image by processing the SFS data based on the image quality optimization model may include obtaining the SFS image, and generating the corresponding optimized image by processing the SFS image based on the image quality optimization model.

In some embodiments, the generating the corresponding optimized image by processing the SFS data based on the image quality optimization model may include obtaining the SFS scan data, obtaining the corresponding optimized scan data by processing the SFS scan data based on the image quality optimization model, and reconstructing the optimized image based on the optimized scan data.

In some embodiments, high-frequency image data and low-frequency image data may be generated by processing the SFS image data.

In some embodiments, the generating the corresponding optimized image by processing the SFS data based on the image quality optimization model may include generating optimized high-frequency image data by processing the high-frequency image data of the SFS image based on the image quality optimization model, and generating the optimized image by superimposing the optimized high-frequency image data and the low-frequency image data of the SFS image.

According to one embodiment of the present disclosure, a system for improving CT image quality may be provided. The system may include an obtainment module configured to obtain SFS data. The SFS data may include SFS scan data or an SFS image. The SFS scan data may be acquired by a CT device in an SFS state. The SFS image may be generated by reconstructing scan data acquired by the CT device via scanning in the SFS state. The system may also include an image optimization module configured to generate a corresponding optimized image by processing the SFS data based on an image quality optimization model. The image quality optimization model may be a machine learning model.

According to another embodiment of the present disclosure, an apparatus for improving CT image quality may be provided. The apparatus may include at least one processor and at least one storage. The at least one storage may be configured to store computer instructions. The at least one processor may be configured to execute at least part of the computer instructions to implement the method for improving the CT image quality as described above.

According to another embodiment of the present disclosure, a computer-readable storage medium may be provided. The computer-readable storage medium may store computer instructions. When the computer reads the computer instructions in the storage medium, the computer may execute the method for improving CT image quality as described above.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
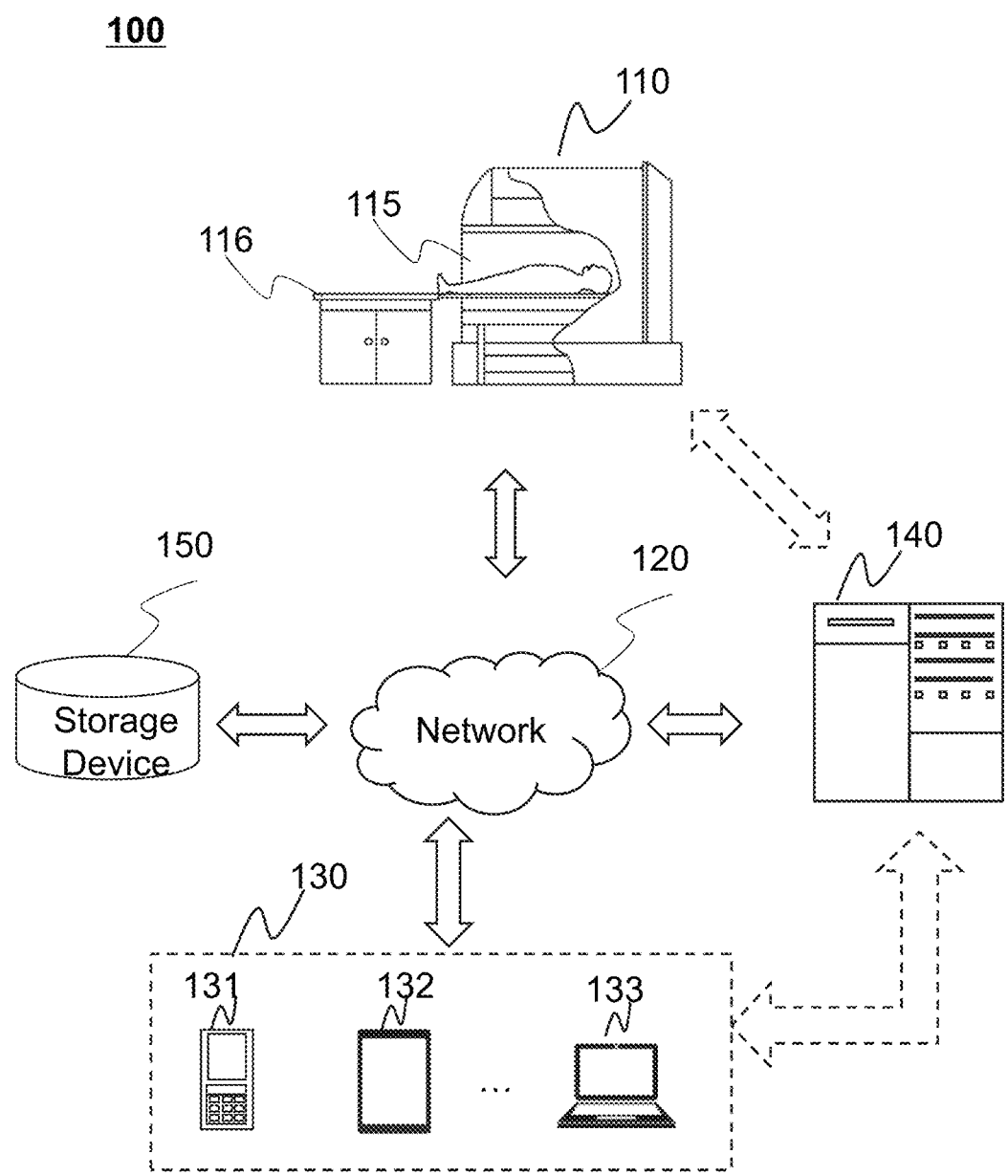
FIG. 1 is a schematic diagram illustrating an exemplary application scenario of an image processing system according to some embodiments of the present disclosure.

In order to illustrate the technical solutions related to the embodiments of the present disclosure, a brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless apparent from the locale or otherwise stated, like reference numerals represent similar structures or operation throughout the several views of the drawings.

It will be understood that the terms "system," "device," "unit," and/or "module" used herein are one method to distinguish different components, elements, parts, sections or assembly of different levels in ascending order. However, if other words may achieve the same purpose, the words may be replaced by other expressions.

As used in the disclosure and the appended claims, the singular forms "a," "an," and "the" include plural referents unless the content clearly dictates otherwise. In general, the terms "comprise," "comprises," "comprising," "include," "includes," and/or "including" merely prompt to include steps and elements that have been clearly identified, and these steps and elements do not constitute an exclusive listing. The methods or devices may also include other steps or elements.

FIG. 1 is a schematic diagram illustrating an exemplary application scenario of an image processing system according to some embodiments of the present disclosure. As shown in FIG. 1, the image processing system 100 may include a scanner 110, a network 120, a terminal 130, a processing device 140, and a storage device 150.

The scanner 110 may scan an object in a detection region and obtain scan data of the object. The object to be scanned may be an organ or a tissue of a human body, such as the head. In some embodiments, the scanner 110 may be an X-ray electronic computed tomography device (X-CT). The CT device may include an X-ray tube, a detector, and a scanning gantry. In some embodiments, the X-ray tube may generate rays, which pass through the human body, and the detector may receive projection data. In some embodiments, the CT device may be a single focal spot (SFS) CT device with an SFS X-ray tube. In some embodiments, the CT device may be a flying focal spot (FFS) CT device with an FFS X-ray tube. More descriptions regarding the FFS CT device may be found elsewhere in the present disclosure. In some embodiments, the CT device may be a CT device having both an SFS state and an FFS state. The CT device may switch between the SFS state and the FFS state.

The network 120 may include any suitable network that facilitates the image processing system 100 to exchange information and/or data. In some embodiments, one or more other components of the image processing system 100 (e.g., the scanner 110, the terminal 130, the processing device 140, and/or the storage device 150) may exchange information and/or data with each other via the network 120. For example, the processing device 140 may obtain image data from the scanner 110 via the network 120. As another example, the processing device 140 may obtain a user instruction from the terminal 130 via the network 120. The network 120 may be and/or include a public network (e.g., the Internet), a private network (e.g., a local area network (LAN), a wide area network (WAN)), a wired network (e.g., the Ethernet), a wireless network (e.g., an 802.11 network, a Wi-Fi network), a cellular network (e.g., an LTE network), a frame relay network, a virtual private network ("VPN"), a satellite network, a telephone network, a router, a hub, a converter, a server computer, or the like, or any combination thereof. For example, the network 120 may include a cable network, a wired network, a fiber optic network, a telecommunications network, a local area network, a wireless local area network (WLAN), a metropolitan area network (MAN), a public switched telephone network (PSTN), a Bluetooth™ network, a ZigBee™ network, a near field communication network (NFC), or the like, or any combination thereof. In some embodiments, the network 120 may include one or more network access points. For example, the network 120 may include wired and/or wireless network access points, such as base stations and/or network switching points, through which one or more components of the system 100 may access the network 120 for data and/or information exchange.

In some embodiments, a user may operate the image processing system 100 through the terminal 130. The terminal 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a smart electrical appliance control device, a smart monitoring device, a smart TV, a smart camera, an intercom, or the like, or any combination thereof. In some embodiments, the wearable device may include a bracelet, footwear, glasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop computer, a tablet computer, a desktop computer, or the like, or any combination thereof. In some embodiments, the virtual reality device and/or the augmented reality device may include a virtual reality helmet, virtual reality glasses, a virtual reality blindfold, an augmented reality helmet, augmented reality glasses, an augmented reality blindfold, or the like, or any combination thereof. For example, the virtual reality device and/or the augmented reality device may include Google Glass™, Oculus Rift™, Hololens™, Gear VR™, and so on. In some embodiments, the terminal 130 may be part of processing device 140.

The processing device 140 may process data and/or information obtained from the scanner 110, the terminal 130, and/or the storage device 150. For example, the processing device 140 may process the beam projection data and optimize the projection data to improve the imaging quality of a scanned image. In some embodiments, the processing device 140 may be a server or a server group. The server group may be centralized or distributed. In some embodiments, the processing device 140 may be local or remote. For example, the processing device 140 may access the information and/or data stored in the scanner 110, the terminal 130, and/or the storage device 150 via the network 120. For example, the processing device 140 may be directly connected to the scanner 110, the terminal 130, and/or the storage device 150 to access the information and/or data stored therein. In some embodiments, the processing device 140 may be executed on a cloud platform. For example, the cloud platform may include a private cloud, a public cloud, a hybrid cloud, a community cloud, a distributed cloud, an inter-cloud, a multi-cloud, or the like, or any combination thereof. In some embodiments, the processing device 140 may be executed by a computing device 200 with one or more components (as described in FIG. 2).

The storage device 150 may store data, instructions, and/or other information. In some embodiments, the storage device 150 may store data obtained from the terminal 130 and/or the processing device 140. In some embodiments, the storage device 150 may store data and/or instructions executed or used by the processing device 140 to perform the exemplary methods described in the present disclosure. In some embodiments, the storage device 150 may include a mass storage device, a removable storage device, a volatile read-and-write memory device, a read-only memory (ROM) device, or the like, or any combination thereof. Exemplary mass storage devices may include a magnetic disk, an optical disk, a solid-state drive, etc. Exemplary removable memory devices may include a flash drive, a floppy disk, an optical disk, a memory card, a zip disk, a magnetic tape, etc. Exemplary volatile read-and-write memory devices may include a random access memory (RAM). Exemplary RAM may include a dynamic RAM (DRAM), a double date rate synchronous dynamic RAM (DDR SDRAM), a static RAM (SRAM), a thyristor RAM (T-RAM), a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 150 may be executed on a cloud platform. For example, the cloud platform may include a private cloud, a public cloud, a hybrid cloud, a community cloud, a distributed cloud, an inter-cloud, a multi-cloud, or the like, or a combination thereof.

In some embodiments, the storage device 150 may be connected to the network 120 to communicate with one or more other components in system 100 (e.g., the processing device 140, the terminal 130, etc.). One or more components in the image processing system 100 may access data or instructions stored in the storage device 150 via the network 120. In some embodiments, the storage device 150 may be directly connected to or communicate with one or more other components (e.g., the processing device 140, the terminal 130) of the system 100. In some embodiments, the storage device 150 may be part of the processing device 140.

Figure 2:
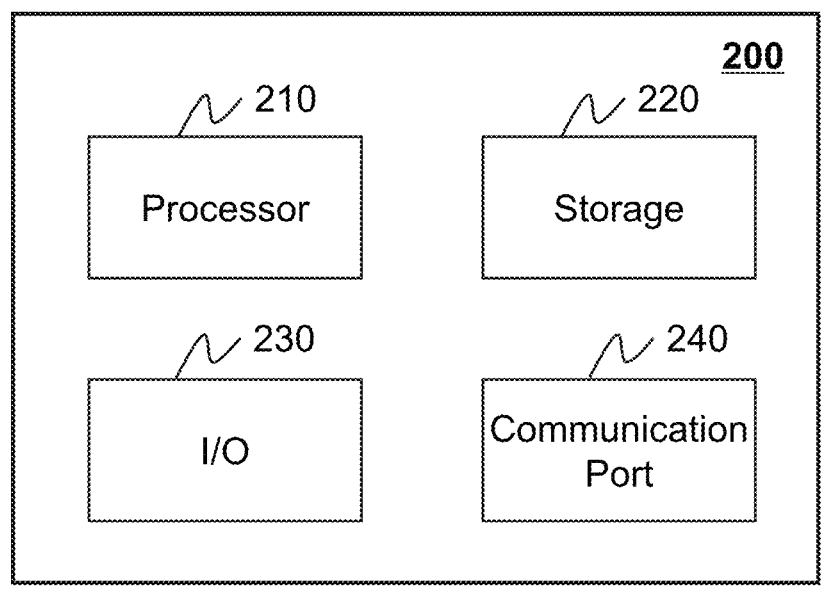
FIG. 2 is a schematic diagram illustrating an exemplary computing device according to some embodiments of the present disclosure.

FIG. 2 is a schematic diagram illustrating an exemplary computing device according to some embodiments of the present disclosure. As shown in FIG. 2, the computing device 200 may include a processor 210, a storage 220, an input/output interface 230, and a communication port 240.

The processor 210 may execute computer instructions (e.g., program codes) and perform functions of the image processing system 100 described in the present disclosure. The computer instructions may include routines, programs, objects, components, data structures, procedures, modules, and functions, which perform particular functions described herein. For example, the processor 210 may process image data obtained from any component of the image processing system 100. In some embodiments, the processor 210 may include a microcontroller, a microprocessor, a reduced instruction set computer (RISC), an application specific integrated circuit (ASIC), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof. Merely for illustration, only one processor is described in the computing device 200. However, it should be noted that the computing device 200 in the present disclosure may also include multiple processors.

The storage 220 may store data/information obtained from any other components of the image processing system 100. In some embodiments, the storage 220 may include a mass storage, a removable storage, a volatile read-and-write storage, a read-only memory (ROM), or the like, or any combination thereof. Exemplary mass storages may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), a digital versatile disk ROM, etc.

The input/output interface 230 may be used to input or output signals, data, or information. In some embodiments, the input/output interface 230 may enable a user interaction with the image processing system 100. In some embodiments, the input/output interface 230 may include an input device and an output device. Exemplary input devices may include a keyboard, a mouse, a touch screen, a microphone, or the like, or any combination thereof. Exemplary output devices may include a display device, a loudspeaker, a printer, a projector, or the like, or a combination thereof. Exemplary display devices may include a liquid crystal display (LCD), a light-emitting diode (LED) based display, a flat panel display, a curved display, a television device, a cathode ray tube (CRT), or the like, or any combination thereof. The communication port 240 may be connected to a network to facilitate data communication. The connection may be a wired connection, a wireless connection, or a combination of thereof. The wired connection may include an electrical cable, an optical cable, a telephone wire, or the like, or any combination thereof. The wireless connection may include a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
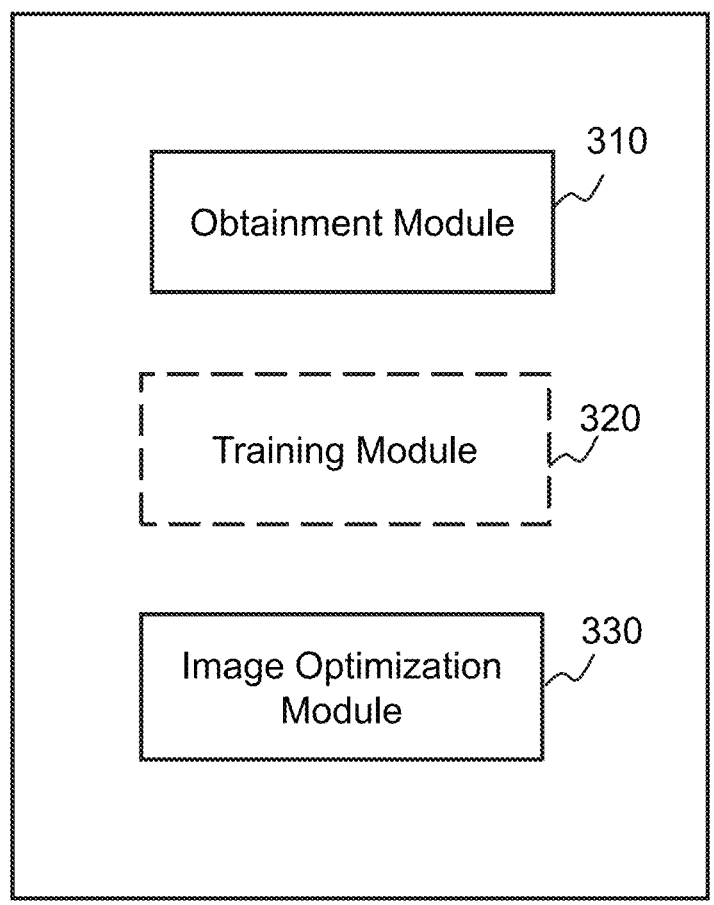
FIG. 3 is a block diagram illustrating a system for improving CT image quality according to some embodiments of the present disclosure.

FIG. 3 is a block diagram illustrating a system for improving CT image quality according to some embodiments of the present disclosure. As shown in FIG. 3, the system for improving the CT image quality may include an obtainment module 310, a training module 320, and an image optimization module 330.

The obtainment module 310 may be configured to obtain SFS data. In some embodiments, the SFS data may include SFS scan data or an SFS image. In some embodiments, the SFS scan data may be acquired by a CT device in an SFS state. The SFS state may refer to that an actual focal spot of electrons emitted by a cathode in an X-ray tube is single and fixed on an anode target surface. In some embodiments, SFS image data may be projection data acquired by the CT device in the SFS state. For example, single focal spot (SFS) projection data may be obtained and be processed into optimized projection data. Then, an optimized tomographic image may be generated by reconstructing the optimized projection data. In some embodiments, the SFS image may be generated by reconstructing scan data acquired by the CT device via scanning in the SFS state. For example, a tomographic image generated by the SFS projection data may be obtained. The optimized tomographic image may be generated by processing single focal spot (SFS) tomographic image data.

The training module 320 may be configured to train an image quality optimization model based on sample images. In some embodiments, the image quality optimization model may be a trained machine learning model. In some embodiments, the image quality optimization model may be a neural network model. The neural network model may include but is not limited to a convolutional neural network (CNN), a deep convolutional neural network (DCNN), a recurrent neural network (RNN), a back propagation (BP) neural network, a radial basis function (RBF) neural network, a residual neural network, etc. In some embodiments, the image quality optimization model may be a residual neural network constituted by several convolutional blocks and several residual blocks. In some embodiments, the SFS image may be used as an input dataset of a training sample, and the FFS image may be used as a target dataset of the training sample. A model may be trained to generate the image quality optimization model accordingly. In some embodiments, the SFS scan data may be used as the input dataset of the training sample, and the FFS scan data may be used as the target dataset of the training sample. The model may be trained to generate the image quality model.

Figure 4:
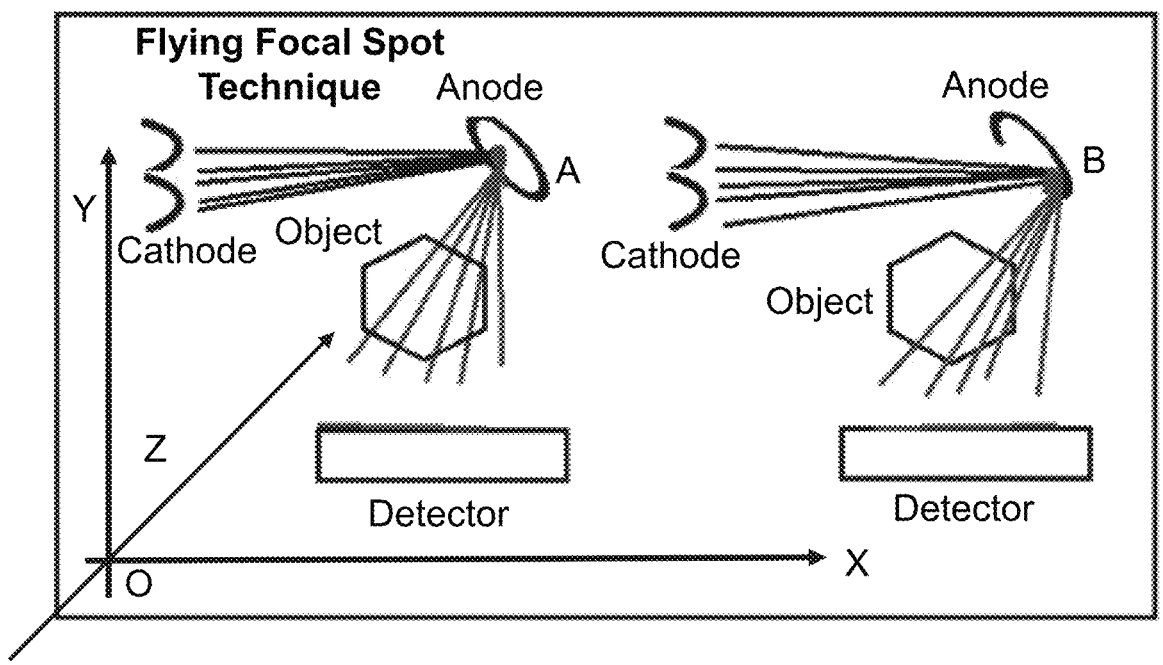
FIG. 4 is a schematic diagram illustrating flying focal spot (FFS) technology according to some embodiments of the present disclosure.

The image optimization module 330 may be configured to generate a corresponding optimized image by processing the SFS image data based on the image quality optimization model. In some embodiments, the image optimization module 330 may generate a simulated FFS image by processing the SFS image using the image quality optimization model, so as to improve the quality of a scanning image. A CT device in the FFS state may use an FFS X-ray tube to generate beams of a plurality of focal spots, thereby increasing an amount of data collected by a detector and improving a resolution of the CT image. FIG. 4 is a schematic diagram illustrating a principle of an FFS X-ray tube. As shown in FIG. 4, the flying focal spot (FFS) technology may use a magnetic field to shift an actual focal spot of an electron beam generated by the cathode on the anode target surface, and the actual focal spot may constantly change on the anode target surface, so that the detector may obtain more data within the same time period. For example, for a bifocal spot CT device, two focal spots (focal spots A and B) may be generated by flying once, which is equivalent to a collection of data obtained by two detectors. In some embodiments, the SFS image may be an input of the image quality optimization model, and an optimized simulated FFS image may be an output of the model, so as to optimize the SFS image and improve the quality of the SFS image.

It should be understood that the system and its modules shown in FIG. 3 may be implemented in various ways. In some embodiments, the system and its modules may be implemented by a hardware, a software, or a combination thereof. As used herein, the hardware may be implemented using dedicated logic, and the software may be stored in a storage and be implemented by an appropriate instruction executing system (e.g., a microprocessor, a dedicated design hardware). It will be appreciated by those skilled in the art that the above methods and systems may be implemented by computer-executable instructions and/or embedding in control codes of a processor. For example, the control codes may be provided by a medium, for example, a disk, a CD or a DVD-ROM, a programmable memory device such as a read-only memory (e.g., firmware), or a data carrier such as an optical or electric signal carrier. The systems and the modules in the present disclosure may be implemented not only by an ultra large scale integrated circuit, a gated array, a semiconductor such as a logic chip or a transistor, a hardware circuit of a programmable hardware device such as a field programmable gate array or a programmable logic device, but also by software executed by various processors, and further also by a combination of the hardware and the software above (e.g., a firmware).

It should be noted that the above description of the candidate display and determination of the system and its modules is only for the convenience of description, and the present disclosure cannot be limited to the scope of the illustrated embodiment. For persons having ordinary skills in the art, after understanding the principle of the system, modules may be combined in various ways or constitute a sub-system to connected to other modules without departing from the principle. For example, the obtainment module 310, the training module 320, and the image optimization module 330 disclosed in FIG. 3 may be different modules in a system, or be one module that implements functions of two or two more modules of the above modules. For example, the training module 320 and the image optimization module 330 may be two modules, or one module having both model training and image optimization functions. For example, each module may share a single storage module. Each module may also have its own storage module. All such modifications are within the protection scope of the present disclosure. In some embodiments, the training module 320 may be omitted, or the training module 320 may be moved to other processing devices for implementation.

Figure 5:
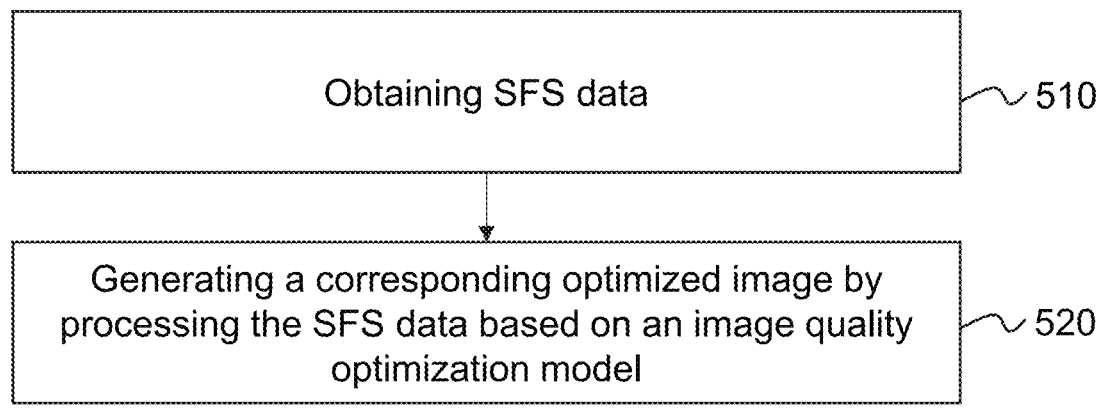
FIG. 5 is a flowchart illustrating an exemplary process for improving CT image quality according to some embodiments of the present disclosure.

FIG. 5 is a flowchart illustrating an exemplary process for improving CT image quality according to some embodiments of the present disclosure.

The process 500 may be executed by a processing logic including a hardware (e.g., a circuit, a dedicated logic, a programmable logic, a microcode), a software (an instruction that runs on the processing device to perform hardware simulation) or the like, or any combination thereof. As shown in FIG. 5, the process for improving the CT image quality may include the following operations.

In 510, SFS data may be obtained. In some embodiments, operation 510 may be performed by the obtainment module 310. In some embodiments, the SFS data may include SFS scan data or an SFS image. The SFS scan data may be acquired by a CT device in an SFS state. The SFS image may be generated by reconstructing scan data acquired by the CT device via scanning in the SFS state. The SFS state of the CT device may refer to that an actual focal spot of electrons emitted by a cathode in an X-ray tube is single and fixed on an anode target surface. Rays generated by an X-ray tube may pass through a human body and be absorbed by a detector, and then the SFS scan data may be acquired. The SFS image may be generated by reconstructing the acquired SFS scan data (for example, using a filtered back-projection reconstruction algorithm or an iterative reconstruction algorithm). An FFS state may be relative to the SFS state of the CT device. The FFS state of the CT device may use an FFS X-ray tube to generate beams of a plurality of focal spots, thereby increasing an amount of data collected by the detector and improving a resolution of the CT image. FIG. 4 is the schematic diagram illustrating the principle of the FFS X-ray tube. As shown in FIG. 4, the FFS technology may use a magnetic field to shift an actual focal spot of an electron beam generated by the cathode on the anode target surface, and the actual focal spot may constantly change on the anode target surface, so that the detector may obtain more data within a same time period. For example, the FFS state of the CT device may include a bifocal spot state. For a bifocal spot CT device, when an electron beam in an X-ray tube flies once, two focal spots (e.g., focal spots A and B in FIG. 4) may be generated, which is equivalent to a collection of data obtained by two detectors. The CT device in the bifocal spot state may obtain SFS scan data by obtaining projection data for odd times or even times. The FFS state of the CT device may also include a multifocal spot state of the CT device (such as a four-focal spot state). An electron beam in the X-ray tube may generate a plurality of focal spots on the anode target surface, and the detector may sequentially obtain scan datasets of the plurality of focal spots. A scan dataset of one of the plurality of focal spots may be used as sample data of the SFS scan data. Alternatively, an SFS image generated by reconstructing the SFS scan data may be used as sample data. The present disclosure is intended to optimize the SFS scan data or image acquired by the CT device in the SFS state to achieve an effect of the FFS image, so as to improve a resolution of the SFS image and reduce artifacts of the SFS image, thereby improving the image quality.

In some embodiments, the SFS image may include SFS projection data acquired by the CT device in the SFS state. For example, the SFS projection data may be obtained and processed to generate optimized projection data. An optimized tomographic image may be generated by reconstructing the optimized projection data. In some embodiments, the SFS image may be a tomographic image reconstructed based on the SFS projection data acquired by the CT device in the SFS state. For example, the tomographic image generated by the SFS projection data may be obtained and processed to generate the optimized tomographic image. As another example, multiple sets of SFS projection data may be acquired and reconstructed to generate a three-dimensional tomographic image. An optimized three-dimensional tomographic image may be generated by processing the three-dimensional tomographic image.

In 520, a corresponding optimized image may be generated by processing the SFS data based on the image quality optimization model. In some embodiments, operation 520 may be performed by the image optimization module 330. In some embodiments, the image optimization module 330 may simulate the SFS image as an FFS image by using the image quality optimization model, so as to improve the quality of a scanning image. In some embodiments, the image quality optimization model may be a trained machine learning model. In some embodiments, the image quality optimization model may be a neural network model. The neural network model may include but is not limited to a CNN, a DCNN, an RNN, a BP neural network, an RBF neural network, a residual neural network, etc. In some embodiments, the image quality optimization model may be a residual neural network constituted by several convolutional blocks and several residual blocks.

In some embodiments, an input of the image quality optimization model may be the SFS image. An output of the model may be an optimized simulated FFS image. In some embodiments, the input of the model may be the SFS projection data, and the output of the model may be simulated FFS projection data. In some embodiments, the SFS image may include a pixel value of each pixel of the SFS image. In some embodiments, a hyperparameter in the image quality optimization model may be preset according to experience and calculation requirements. For example, the image quality optimization model may divide an input image or scan data into blocks, and separately perform the calculation on each block of the image or scan data. A count of the blocks may be set according to experience and an amount of the input data.

Figure 6:
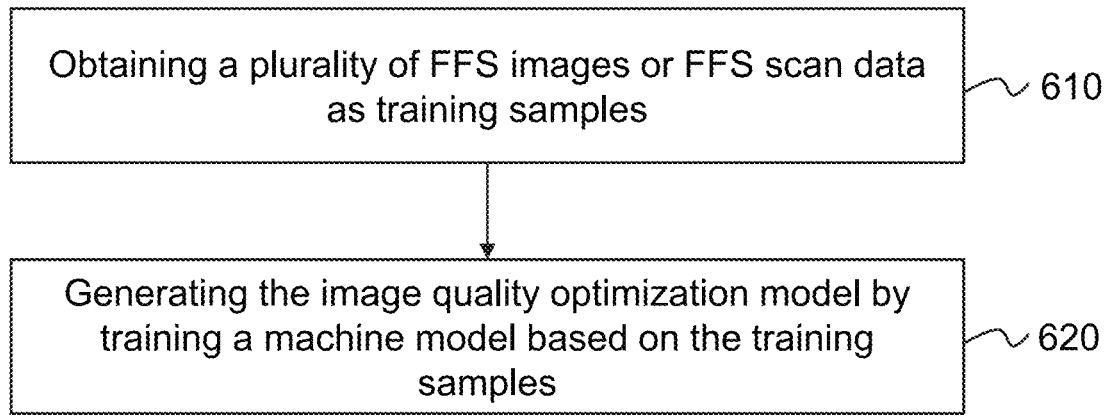
FIG. 6 is a flowchart illustrating an exemplary process for training an image quality optimization model according to some embodiments of the present disclosure.

FIG. 6 is a flowchart illustrating an exemplary process for training an image quality optimization model according to some embodiments of the present disclosure.

The process 600 may be performed by a processing logic including a hardware (e.g., a circuit, a dedicated logic, a programmable logic, a microcode), a software (instructions running on a processing device to perform a hardware simulation) or the like, or any combination thereof. As shown in FIG. 6, the process for training the image quality optimization model may include the following operations.

In 610, a plurality of FFS images or FFS scan data may be obtained as training samples. In some embodiments, operation 610 may be performed by the training module 320. In some embodiments, the training samples may include the FFS scan data and corresponding SFS scan data. The FFS scan data may be acquired by the CT device in an FFS state. In some embodiments, the training samples may include FFS images and the corresponding SFS images. In some embodiments, the FFS images may be generated by reconstructing scan data acquired by the CT device via scanning in the FFS state. In some embodiments, an image of a focal spot in the FFS image may be used as the SFS image in the training samples. For example, For a CT device in the bifocal spot state, the SFS image may be generated by reconstructing projection data obtained by a detector for odd times or even times. For a CT device in the multifocal spot state, scan data of one of multiple focal spots may be obtained and reconstructed to generate the SFS image.

In 620, the image quality optimization model may be generated by training a machine model based on the training samples. In some embodiments, operation 620 may be performed by the training module 320. In some embodiments, the SFS images may be used as input datasets of the training samples, and the FFS images may be used as target datasets of the training samples, and the image quality optimization model may be generated by training the model accordingly. In some embodiments, the training samples may be FFS projection data and SFS projection data, and a trained model may be used to optimize the SFS projection data. An optimized tomographic image may be generated by reconstructing the optimized projection data.

In some embodiments, the training samples may be FFS data in multiple particular directions and the SFS data. In some embodiments, the FFS data in a particular direction may refer that a focal spot of an electron beam in a tube moves back and forth on a target surface along the particular direction. For example, an X-direction flying focal spot may be a focal spot that moves back and forth on the target surface along a direction perpendicular to a tomography. A Z-direction flying focal spot (FFS) may be a focal spot that moves back and forth on the target surface along a Z-direction parallel to a moving bed (referring to the coordinate direction shown in FIG. 4). In some embodiments, the SFS data may be used as the input dataset, and the FFS tomographic image data in the particular direction may be used as the target dataset. The model may be trained to generate an image quality optimized model that may optimize image data in the particular direction, so as to improve the image quality of the tomographic image in the particular direction. For example, as shown in FIG. 4, a Y direction may be a direction of a connection line of a tube and a center position of the detector, the X-direction may be an extension direction of a channel of the detector, and the Z-direction may be a movement direction of the bed. To optimize the tomographic image in the Z direction, a Z-direction FFS tomographic image (reconstructed based on a plurality of pieces of Z-direction FFS projection data) and a Z-direction SFS tomographic image may be obtained and used to train the model to generate a Z-direction image quality optimization model. In application, the SFS tomographic image may be inputted into the Z-direction image quality optimization model, and an optimized Z-direction tomographic image may be outputted.

Figure 7:
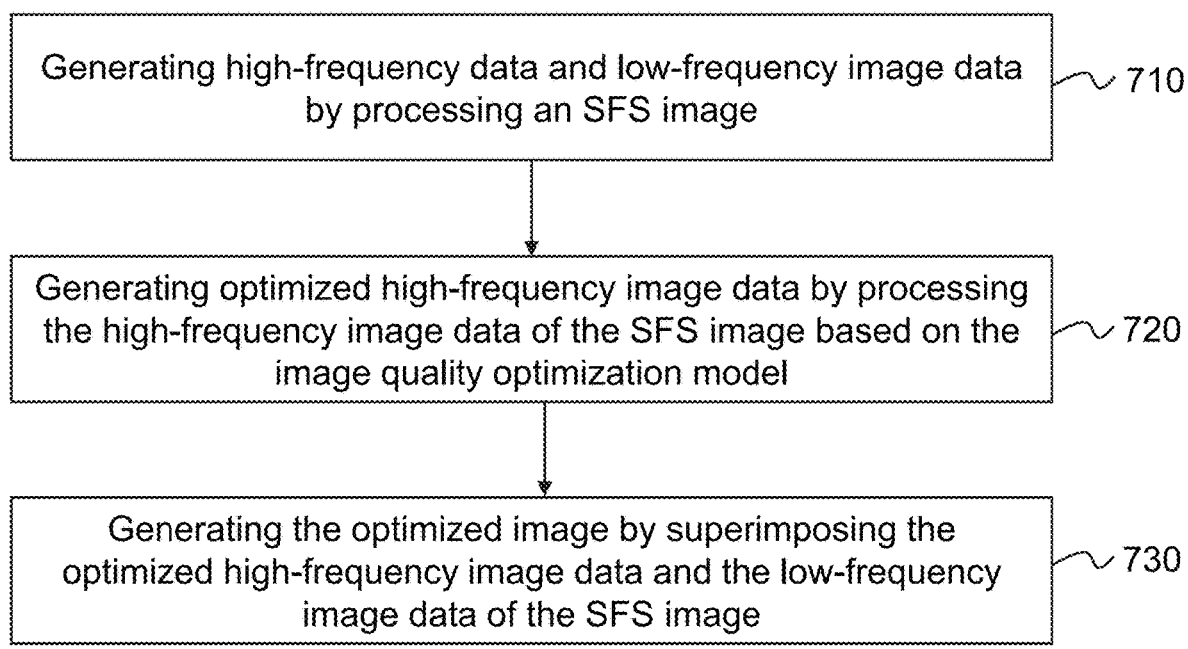
FIG. 7 is another flowchart illustrating an exemplary process for improving CT image quality according to some embodiments of the present disclosure.

FIG. 7 is another flowchart illustrating an exemplary process for improving CT image quality according to some embodiments of the present disclosure.

The process 700 may be performed by a processing logic including a hardware (e.g., a circuit, a dedicated logic, a programmable logic, a microcode), a software (an instruction running on a processing device to perform hardware simulation), or the like, or any combination thereof. As shown in FIG. 7, the process for improving the CT image quality may include the following operations.

In 710, an SFS image may be processed to generate high-frequency image data and low-frequency image data. In some embodiments, operation 710 may be performed by the image optimization module 330. After the rays pass through the human body, tissues with different densities may have different attenuation coefficients, resulting in different CT values (for example, a CT value of the bone is higher). In order to avoid that the model pays more attention to data with a larger CT value, and a tissue with a lower CT value is shown insufficiently, an input SFS image may first be filtered to generate the high-frequency image data and the low-frequency image data in the input SFS image. Only the high-frequency image data may be optimized. In some embodiments, the filtering manner may include low-pass filtering, smoothing filtering, high-pass filtering (which may directly extract the high-frequency image data), noise filtering, band-stop filtering, or the like, or any combination thereof. For example, a low-pass filter may be used to generate the low-frequency image data of the SFS image. Then, the high-frequency image data of the original SFS image may be generated by subtracting the low-frequency image data from the original SFS image. As another example, a high-pass filter may be used to generate the high-frequency image data of the SFS image. Then, the low-frequency image data of the original SFS image may be generated by subtracting the high-frequency image data from the original SFS image.

In 720, optimized high-frequency image data may be generated by processing the high-frequency image data of the SFS image based on the image quality optimization model. In some embodiments, operation 720 may be performed by the image optimization module 330. In some embodiments, the image quality optimization model may be a trained machine learning model. Training samples may be high-frequency image data of a certain count of FFS images and high-frequency image data of SFS images. In some embodiments, the high-frequency image data of the FFS images may be generated by filtering FFS image data acquired in an FFS state. An image of a focal spot acquired by the device in the FFS state may be designated as one SFS image. The high-frequency image data of the SFS images may be generated by filtering the SFS images. In some embodiments, when the trained image quality optimization model is used to optimize the high-frequency image data of the original image, the SFS image data acquired by the device in an SFS state may be obtained and filtered to generate the high-frequency image data as an input of the model. The model may output the optimized high-frequency image data.

In 730, the optimized image may be generated by superposing the optimized high-frequency image data and the low-frequency image data of the SFS image. In some embodiments, operation 730 may be performed by the image optimization module 330.

Figure 8:
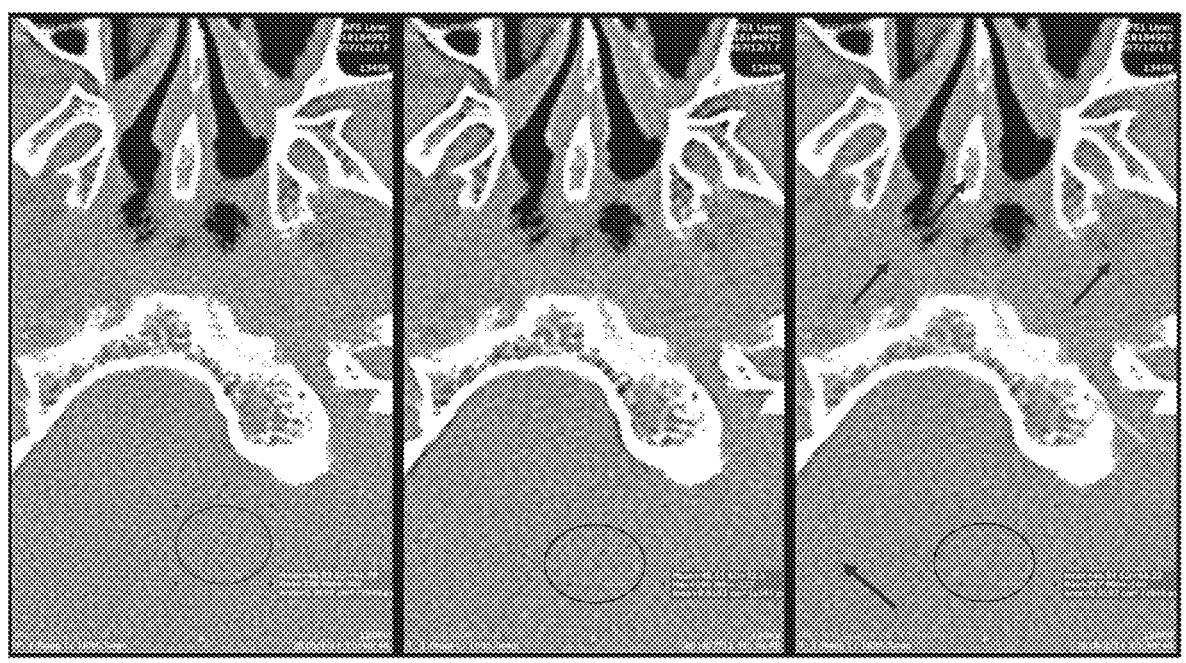
FIG. 8 is a comparison diagram illustrates an FFS image, an optimized image, and an SFS image according to some embodiments of the present disclosure.

FIG. 8 is a comparison diagram illustrating an FFS image, an optimized image and an SFS image. The rightmost image is the FFS image obtained in an FFS state, the leftmost image is the SFS image obtained in an SFS state, and the middle image is an optimized SFS image generated by optimizing the leftmost SFS image. By comparison, it may be seen that bar artifacts (as indicated by the arrows) in the optimized image (i.e., the middle image) are significantly reduced, the resolution of a bone structure is significantly improved, and the noise granularity becomes more delicate (as shown in the circles). As shown in the FIG. 8, a standard deviation (SD) of pixels in the SFS image is 65.22, a standard deviation (SD) of pixels in the optimized SFS image is 72.3, and a standard deviation(SD) of pixels in the FFS image is 81.78. The SD value of the pixels in the optimized SFS image is significantly larger than the SD value of the pixels in the SFS image, and close the SD value of the pixels in the FFS image. A larger SD value may indicate more abundant high-frequency information, a larger image resolution, and better details in an image.

It should be noted that the above description regarding the process 700 is merely provided for the purposes of illustration, and not intended to limit the scope of the present disclosure. For persons having ordinary skills in the art, multiple variations and modifications may be made for the process 700 under the teachings of the present disclosure. However, those variations and modifications do not depart from the scope of the present disclosure.

The possible benefits of embodiments of the present disclosure may include but are not limited to: (1) improving the image quality of the SFS image without increasing the cost of the device; (2) optimizing the high-frequency image data in the SFS image, thereby improving the imaging quality of the bone structure. It should be noted that different embodiments may have different beneficial effects. In different embodiments, the possible beneficial effects may be any of the above, or the like, or any combination thereof, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should consider specified significant digits and adopt ordinary rounding techniques. Notwithstanding that the numerical ranges and parameters configured to illustrate the broad scope of some embodiments of the present disclosure are approximations, the numerical values in specific examples may be as accurate as possible within a practical scope.

Contents of each of patents, patent applications, publications of patent applications, and other materials, such as articles, books, specifications, publications, documents, or the like, referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

At last, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A method for improving CT image quality, comprising:
obtaining single focal spot (SFS) data, the SFS data including at least one of single focal spot (SFS) scan data or a single focal spot (SFS) image, wherein the SFS scan data is acquired by a CT device in a single focal spot (SFS) state, and the SFS image is generated by reconstructing scan data acquired by the CT device via scanning in the SFS state; and
generating a flying focal spot (FFS) image corresponding to the SFS data by processing the obtained SFS data using an image quality optimization model, the image quality optimization model being a machine learning model.

2. The method of claim 1, wherein
the image quality optimization model is generated through training with sample data,
the sample data includes flying focal spot (FFS) scan data or flying focal spot (FFS) images,
the FFS scan data is acquired by a CT device in a flying focal spot (FFS) state, and
the FFS images are reconstructed based on scan data acquired by the CT device via scanning in the FFS state.

3. The method of claim 1, wherein the image quality optimization model is a residual neural network model.

4. The method of claim 1, wherein the generating a flying focal spot (FFS) image corresponding to the SFS data by processing the obtained SFS data using an image quality optimization model includes:
obtaining the SFS image; and
generating the FFS image corresponding to the SFS image by processing the SFS image based on the image quality optimization model.

5. The method of claim 1, wherein the generating a flying focal spot (FFS) image corresponding to the SFS data by processing the obtained SFS data using an image quality optimization model includes:
obtaining the SFS scan data;
generating FFS scan data corresponding to the SFS scan data by processing the SFS scan data based on the image quality optimization model; and
reconstructing the FFS image based on the FFS scan data.

6. The method of claim 1, further comprising:
generating high-frequency image data and low-frequency image data by processing the SFS image.

7. The method of claim 6, wherein the generating a flying focal spot (FFS) image corresponding to the SFS data by processing the obtained SFS data using an image quality optimization model includes:
generating optimized high-frequency image data by processing the high-frequency image data of the SFS image based on the image quality optimization model; and
generating the FFS image corresponding to the SFS image by superimposing the optimized high-frequency image data and the low-frequency image data of the SFS image.

8. A system for improving CT image quality, comprising:
an obtainment module configured to obtain SFS data, the SFS data including at least one of SFS scan data or an SFS image; wherein the SFS scan data is acquired by a CT device in an SFS state, and the SFS image is generated by reconstructing scan data acquired by the CT device via scanning in the SFS state; and
an image optimization module configured to generate an FFS image corresponding to the SFS data by processing the obtained SFS data using an image quality optimization model, the image quality optimization model being a machine learning model.

9. The system of claim 8, wherein
the image quality optimization model is generated through training with sample data,
the sample data includes FFS scan data or FFS images,
the FFS scan data is acquired by a CT device in an FFS state, and
the FFS images are reconstructed based on scan data acquired by the CT device via scanning in the FFS state.

10. The system of claim 8, wherein the image quality optimization model is a residual neural network model.

11. The system of claim 8, wherein to generate a flying focal spot (FFS) image corresponding to the SFS data by processing the obtained SFS data using an image quality optimization model, the image optimization module is configured to:
obtain the SFS image; and
generate the FFS image corresponding to the SFS image by processing the SFS image based on the image quality optimization model.

12. The system of claim 8, wherein to generate a flying focal spot (FFS) image corresponding to the SFS data by processing the obtained SFS data using an image quality optimization model, the image optimization module is configured to:
obtain the SFS scan data;
generate FFS scan data corresponding to the SFS scan data by processing the SFS scan data based on the image quality optimization model; and
reconstruct the FFS image based on the FFS scan data.

13. The system of claim 8, wherein the image optimization module is configured further to:
generate high-frequency image data and low-frequency image data by processing the SFS image.

14. The system of claim 13, wherein to generate a flying focal spot (FFS) image corresponding to the SFS data by processing the obtained SFS data using an image quality optimization model, the image optimization module is configured to:
generate optimized high-frequency image data by processing the high-frequency image data of the SFS image based on the image quality optimization model; and
generate the FFS image corresponding to the SFS image by superimposing the optimized high-frequency image data and the low-frequency image data of the SFS image.

15. A non-transitory computer-readable storage medium storing computer instructions, and when red by a computer, the computer executes a method for improving CT image quality, the method comprising:

obtaining SFS data, the SFS data including at least one of SFS scan data or an SFS image, wherein the SFS scan data is acquired by a CT device in an SFS state, and the SFS image is generated by reconstructing scan data acquired by the CT device via scanning in the SFS state; and generating an FFS image corresponding to the SFS data by processing the obtained SFS data using an image quality optimization model, the image quality optimization model being a machine learning model.

16. The non-transitory computer-readable storage medium of claim 15, wherein the image quality optimization model is generated through training with sample data, the sample data includes FFS scan data or FFS images, the FFS scan data is acquired by a CT device in an FFS state, and the FFS images are reconstructed based on scan data acquired by the CT device via scanning in the FFS state.

17. The non-transitory computer-readable storage medium of claim 15, wherein the generating a flying focal spot (FFS) image corresponding to the SFS data by processing the obtained SFS data using an image quality optimization model includes:

obtaining the SFS image; and generating the FFS image corresponding to the SFS image by processing the SFS image based on the image quality optimization model.

18. The non-transitory computer-readable storage medium of claim 15, wherein the generating a flying focal spot (FFS) image corresponding to the SFS data by processing the obtained SFS data using an image quality optimization model includes:

obtaining the SFS scan data;

generating FFS scan data corresponding to the SFS scan data by processing the SFS scan data based on the image quality optimization model; and reconstructing the FFS image based on the FFS scan data.

19. The non-transitory computer-readable storage medium of claim 15, further comprising:

generating high-frequency image data and low-frequency image data by processing the SFS image.

20. The non-transitory computer-readable storage medium of claim 19, wherein the generating a flying focal spot (FFS) image corresponding to the SFS data by processing the obtained SFS data using an image quality optimization model includes:

generating optimized high-frequency image data by processing the high-frequency image data of the SFS image based on the image quality optimization model; and generating the FFS image corresponding to the SFS image by superimposing the optimized high-frequency image data and the low-frequency image data of the SFS image.

* * * * *